United States Patent
Turner et al.

(10) Patent No.: US 10,746,098 B2
(45) Date of Patent: Aug. 18, 2020

(54) COMPRESSOR ROTOR COOLING APPARATUS

(71) Applicant: General Electric Company, Schenectady, NY (US)

(72) Inventors: Alan Glenn Turner, Wyoming, OH (US); V Mohan Babu, Bangalore (IN); Anand P. Roday, Mason, OH (US); Monty Lee Shelton, Loveland, OH (US)

(73) Assignee: General Electric Company, Schenectady, NY (US)

( * ) Notice: Subject to any disclaimer, the term of this patent is extended or adjusted under 35 U.S.C. 154(b) by 77 days.

(21) Appl. No.: 15/916,477

(22) Filed: Mar. 9, 2018

(65) Prior Publication Data

US 2019/0277192 A1 Sep. 12, 2019

(51) Int. Cl.
*F02C 3/06* (2006.01)
*F04D 29/58* (2006.01)
*F02C 7/18* (2006.01)
*F04D 29/54* (2006.01)
*F01D 5/08* (2006.01)
*F01D 5/30* (2006.01)

(52) U.S. Cl.
CPC ............... *F02C 3/06* (2013.01); *F01D 5/084* (2013.01); *F01D 5/087* (2013.01); *F01D 5/3007* (2013.01); *F02C 7/18* (2013.01); *F04D 29/542* (2013.01); *F04D 29/584* (2013.01); *F04D 29/5833* (2013.01); *F05D 2220/32* (2013.01); *F05D 2240/30* (2013.01); *F05D 2260/20* (2013.01)

(58) Field of Classification Search
CPC ......... F05D 2220/3219; F04D 29/5846; F04D 29/582; F04D 29/584; F04D 29/58; F01D 5/08; F01D 5/081; F01D 5/082
See application file for complete search history.

(56) References Cited

U.S. PATENT DOCUMENTS

| | | | |
|---|---|---|---|
| 3,734,646 A * | 5/1973 | Perkins | F01D 5/3015 416/220 R |
| 5,685,158 A | 11/1997 | Lenahan et al. | |
| 6,540,477 B2 | 4/2003 | Glynn et al. | |
| 6,672,072 B1 * | 1/2004 | Giffin, III | F01D 5/08 60/728 |
| 7,993,102 B2 | 8/2011 | Desai et al. | |

(Continued)

FOREIGN PATENT DOCUMENTS

| CN | 106368821 A | 2/2017 |
|---|---|---|
| GB | 2075123 A | 11/1981 |

OTHER PUBLICATIONS

The State Intellectual Property Office of China, "Office Action," dated Apr. 20, 2020 in connection with Chinese Patent Application No. 201910175709.8, 5 pages.

*Primary Examiner* — Woody A Lee, Jr.
*Assistant Examiner* — Andrew Thanh Bui
(74) *Attorney, Agent, or Firm* — Hanley, Flight & Zimmerman, LLC

(57) ABSTRACT

A compressor cooling apparatus includes: a blade row mounted for rotation about a centerline axis; a stationary diffuser located downstream of, and in flow communication with, the blade row; an inducer disposed between the diffuser and the blade row, the inducer having an inlet in flow communication with the diffuser, and having an outlet oriented to direct flow towards the blade row.

20 Claims, 4 Drawing Sheets

(56) References Cited

U.S. PATENT DOCUMENTS

| | | |
|---|---|---|
| 8,256,229 B2 | 9/2012 | Glahn et al. |
| 8,459,040 B2 | 6/2013 | Glahn et al. |
| 8,869,538 B2 * | 10/2014 | Nanda ................... F01D 25/14 60/796 |
| 8,973,371 B2 | 3/2015 | King et al. |
| 8,979,482 B2 | 3/2015 | Khanin et al. |
| 9,074,605 B2 | 7/2015 | Boum et al. |
| 9,091,172 B2 | 7/2015 | Wolfgram et al. |
| 9,091,173 B2 | 7/2015 | Mosley et al. |
| 9,188,009 B2 | 9/2015 | Yilmaz et al. |
| 9,234,463 B2 | 1/2016 | Benjamin et al. |
| 2008/0019829 A1 | 1/2008 | Argaud et al. |
| 2008/0141677 A1 * | 6/2008 | Brillert .................. F01D 5/081 60/785 |
| 2016/0010476 A1 | 1/2016 | Grover |
| 2016/0076381 A1 | 3/2016 | Suciu et al. |
| 2016/0090914 A1 | 3/2016 | Lyons |
| 2016/0146016 A1 | 5/2016 | Johns et al. |
| 2016/0222982 A1 | 8/2016 | Powell et al. |
| 2016/0312615 A1 | 10/2016 | Lyons |
| 2017/0009663 A1 | 1/2017 | Epstein |
| 2017/0167271 A1 | 6/2017 | McCaffrey |
| 2017/0211586 A1 | 7/2017 | Gage et al. |
| 2017/0211590 A1 | 7/2017 | Moinz et al. |
| 2017/0260905 A1 | 9/2017 | Schmitz |
| 2017/0292532 A1 | 10/2017 | Wall |

\* cited by examiner

COMPRESSOR ROTOR COOLING APPARATUS

BACKGROUND OF THE INVENTION

This invention relates generally to compressors in gas turbine engines, and more particularly relates to cooling in such compressors.

A gas turbine engine includes, in serial flow communication, a compressor, a combustor, and turbine. The turbine is mechanically coupled to the compressor and the three components define a turbomachinery core. The core is operable in a known manner to generate a flow of hot, pressurized combustion gases to operate the engine as well as perform useful work such as providing propulsive thrust or mechanical work.

Modern aviation gas turbines are running at higher and higher overall pressure ratios ("OPR"), providing improvement in specific fuel consumption ("SFC").

One problem with higher OPRs is that they result in higher compressor discharge temperatures (T3). High T3 temperatures are challenging the creep and fatigue capability of the aft stages of modern compressors.

BRIEF DESCRIPTION OF THE INVENTION

This problem is addressed by a compressor cooling apparatus which is configured to channel cooling air from a downstream diffuser to a final stage of the compressor.

According to one aspect of the technology described herein, a compressor cooling apparatus includes: a blade row mounted for rotation about a centerline axis; a stationary diffuser located downstream of, and in flow communication with, the blade row; an inducer disposed between the diffuser and the blade row, the inducer having an inlet in flow communication with the diffuser, and having an outlet oriented to direct flow towards the blade row.

According to another aspect of the technology described herein, a gas turbine engine apparatus includes: a compressor, a combustor, and a turbine arranged in a serial flow relationship, wherein the compressor includes: an annular compressor casing; a blade row mounted for rotation about a centerline axis inside the compressor casing; a stationary diffuser located downstream of, and in flow communication with, the blade row; an inducer disposed between the diffuser and the compressor, the inducer having an inlet in flow communication with the diffuser, and having an outlet oriented to direct flow towards the blade row.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
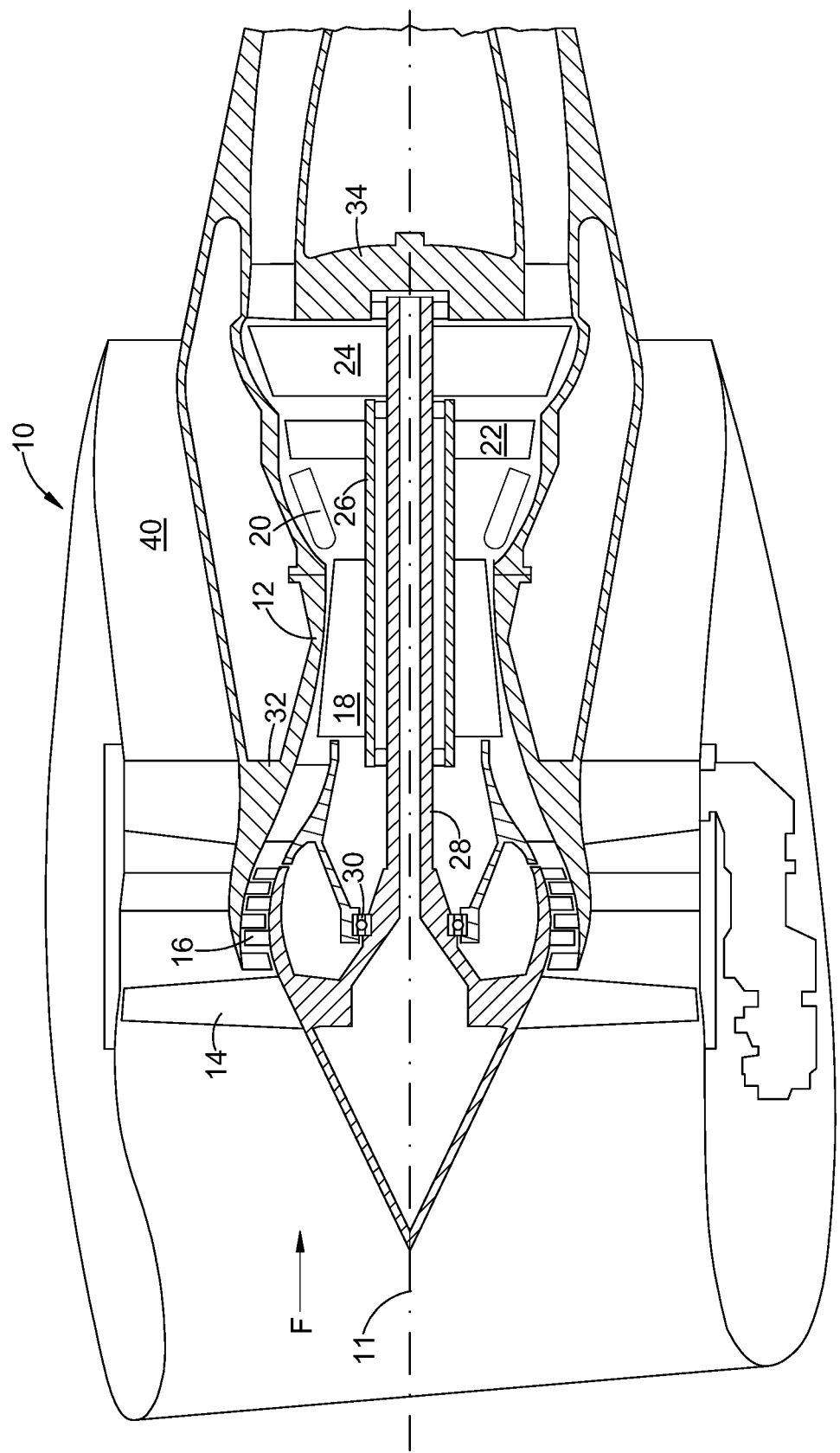
FIG. 1 is a cross-sectional, schematic view of a gas turbine engine that incorporates a compressor cooling apparatus.

Referring to the drawings wherein identical reference numerals denote the same elements throughout the various views, FIG. 1 depicts an exemplary gas turbine engine 10 incorporating a compressor rotor cooling apparatus. While the illustrated example is a high-bypass turbofan engine, the principles of the present invention are also applicable to other types of engines, such as low-bypass turbofans, turbojets, stationary gas turbines, etc. Several of the components of the engine 10 are illustrated in schematic block diagram form. The engine 10 has a longitudinal centerline axis 11 and an outer stationary annular casing 12 disposed concentrically about and coaxially along the centerline axis 11. The engine 10 has a fan 14, booster 16, high-pressure compressor ("HPC") 18, combustor 20, high-pressure turbine ("HPT") 22, and low-pressure turbine ("LPT") 24 arranged in serial flow relationship. In operation, pressurized air from the high-pressure compressor 18 is mixed with fuel in the combustor 20 and ignited, thereby generating combustion gases. Some work is extracted from these gases by the high-pressure turbine 22 which drives the compressor 18 via an outer shaft 26. The combustion gases then flow into the low-pressure turbine 24, which drives the fan 14 and booster 16 via an inner shaft 28. The inner and outer shafts 28 and 26 are rotatably mounted in bearings 30 which are themselves mounted in a fan frame 32 and a turbine rear frame 34.

It is noted that, as used herein, the terms "axial" and "longitudinal" both refer to a direction parallel to the centerline axis 11, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

Figure 2:
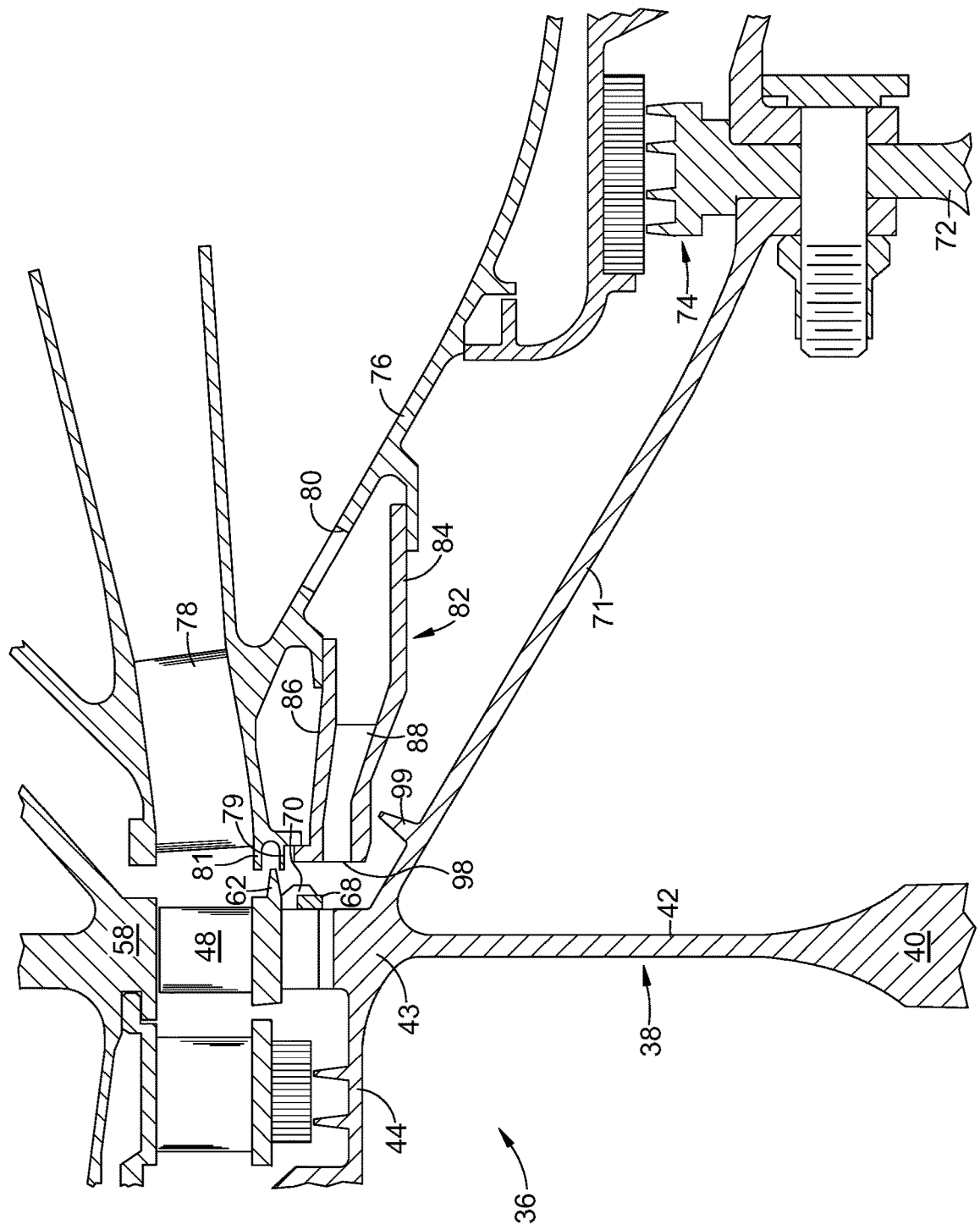
FIG. 2 is a schematic, half-sectional view of a portion of a compressor of the engine of FIG. 1.

Illustrated in FIG. 2 is a schematic representation of a portion of a rotor assembly 36 of the HPC 18. It will be understood that the compressor includes a number of stages of axial-flow blading; for example, a typical compressor could include 6-14 stages. In operation, the static air pressure is incrementally increased by each subsequent compressor stage, with the final stage discharging air at the intended compressor discharge pressure ("CDP") for subsequent flow into a diffuser and thence into a combustor. The concepts described herein relate to the configuration at the aft end (exit) of the compressor 18.

The rotor assembly 36 includes a final stage rotor disk 38 with a hub 40, a web 42, and a rim 43. The rim 43 is integral with a generally cylindrical compressor spool 44, as are the rotor disks of other stages of the compressor 18 (not shown).

Figure 3:
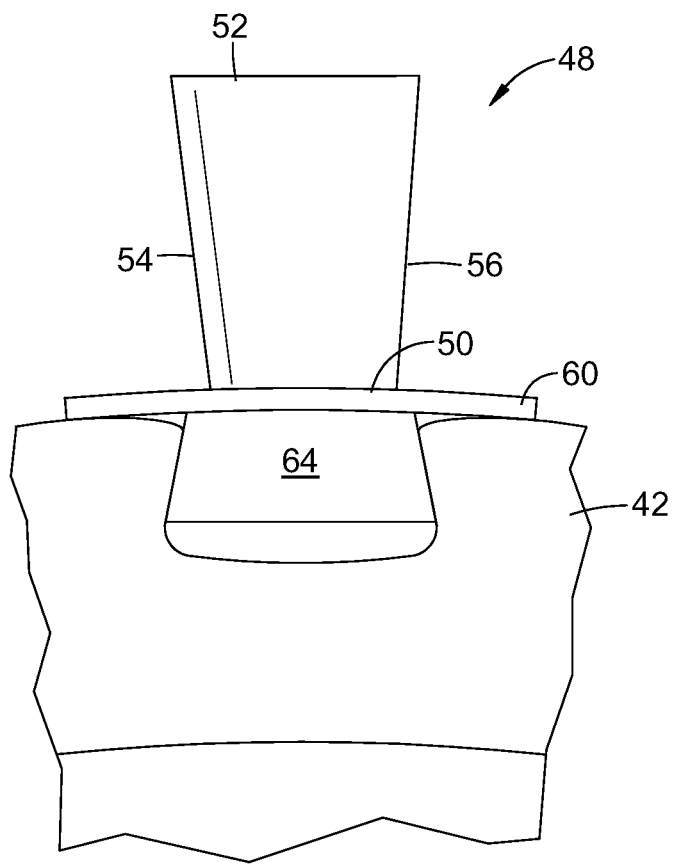
FIG. 3 is front elevation view of a portion of a rotor and a compressor blade.

The rim 43 includes a plurality of axial dovetail slots 46 (see FIG. 3) carrying a row of compressor blades 48. Each compressor blade 48 includes an airfoil body having opposed pressure and suction sides extending in span between a root 50 and a tip 52 and in chord between a leading edge 54 and a trailing edge 56. The tips 52 of the compressor blades 48 run in close proximity to a surrounding annular compressor casing 58 (FIG. 2).

Each compressor blade 48 includes a platform 60 which extends laterally outwards to define a flowpath surface and extends axially aft to form an arcuate sealing element 62 referred so as an "angel wing" (see FIG. 2).

Each compressor blade 48 has a dovetail 64 formed at its base, inboard of the platform 60. The dovetails 64 are received in complementary dovetail slots 66 formed in the rim 43. The blades may be retained axially by a split ring 68 engaging hooks 70 in the rim 43.

A generally conical aft arm 71 extends axially rearward and radially inward from the rim 18 and is joined to a CDP seal rotor 72 which carries one-half of a rotating CDP seal 74. The other half of the CDP seal 74 is mounted to an annular wall 76 of a stationary diffuser 78.

Feed holes 80 are provided in the diffuser wall 76 which pass CDP air into the space between the diffuser wall 76 and the aft arm 71.

The forward end of the diffuser 78 incorporates an arcuate inner sealing element 79 positioned radially inboard of the angel wing 62 and overlapping the angel wing 62 in the axial direction. The forward end of the diffuser 78 incorporates an arcuate outer sealing element 81 positioned radially outboard of the angel wing 62 and overlapping the angel wing 62 in the axial direction. Collectively, the angel wing 62 and the inner and outer sealing elements 79, 81 form a double-overlapping rotating seal.

An inducer 82 is mounted to the wall 76 of the diffuser 78, using appropriate fasteners, mechanical joints, or a combination thereof. The inducer 82 comprises an annular inner wall 84 spaced apart from an annular outer wall 86. The inner and outer walls 84, 86 are interconnected by a central wall structure 88.

Figure 4:
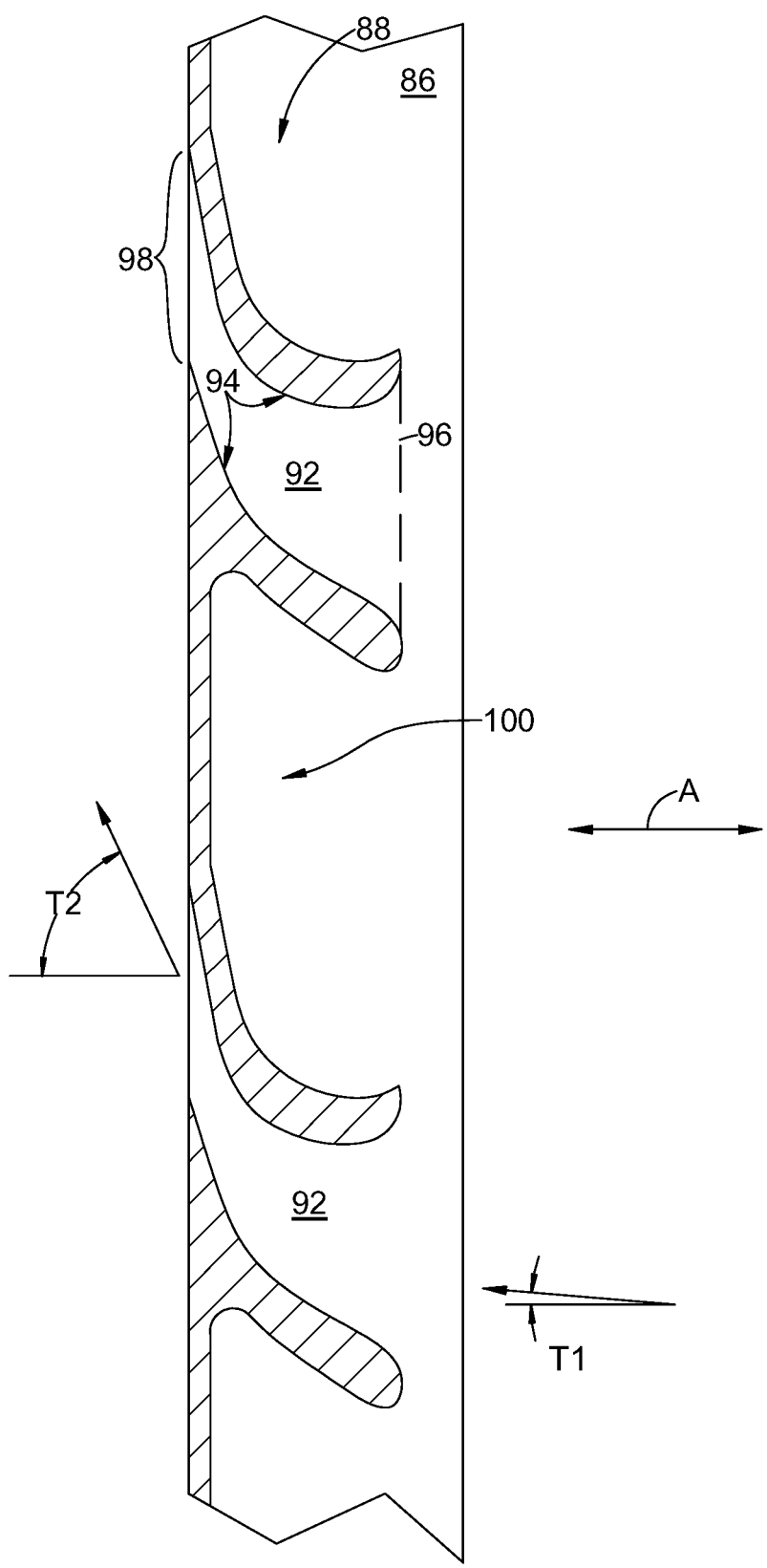
FIG. 4 is a schematic sectional plan view of a portion of an inducer shown in FIG. 2.

The central wall structure 88 is shown in more detail in FIG. 4. it defines an array of channels 92 disposed around the circumference of the inducer 82. Each channel is bounded at its lateral extents by sidewalls 94, and extends between an inlet 96, which is in flow communication with the feed holes 80, and an outlet 98. The outlets 98 are positioned just downstream (e.g. axially aft) of the rim 43, and at approximately the same radius as the rim 43.

The channels 92 are configured to turn and/or accelerate the flow passing through them in a tangential direction to change a tangential velocity (or tangential velocity component) of the flow. This may be done for the purpose of matching the tangential velocity of the rotor disk 38. In one example the input tangential angle "T1" of the flow is about 0° relative to axial direction "A", and the output tangential angle "T2" of the flow is about 70° to about 80°.

The configuration of the channels 92, including characteristics such as their number, sectional shape, length dimension, radial dimension, convergence angle, and orientation may be selected using appropriate design tools to provide a desired degree of flow turning with the least amount of pressure loss for a specific application and range of operational conditions.

In the illustrated example, the central wall structure 88 incorporates "cut-outs" 100 between the channels 92, which are areas where material is removed for the purposes of saving weight.

During engine operation a portion of the compressed air from the diffuser 78 passes through the feed holes 80 and into the inducer 82. The air is turned and accelerated to match its velocity to the tangential velocity of the rim 43. The air is then discharged towards the rim 43 where it is effective to cool the rim and/or the compressor blades 48. The double-overlap sealing arrangement described above prevents the cooling air flow from leaking back into the primary flowpath.

Additionally, the aft arm 71 may be provided with a rotating seal 99 such as the illustrated annular seal tooth which extends radially outwards, terminating in close proximity to the inducer 82. This is effective to inhibit cooling air discharged from the inducer 82 from leaking into the secondary flowpath away from the rim 43. The spent cooling air can flow through the axial dovetail slots 66 to exit to a lower pressure sink.

Optionally, the compressor blades 48 could be provided with one or more internal passages open to the dovetail slots 66 in order to channel the cooling flow into the compressor blades and thus provide cooling.

The compressor cooling apparatus described herein has advantages over the prior art. Analysis has shown it can significantly reduce transient peak temperatures compared to the prior art. This cooling configuration will allow the aft rim of the compressor to meet creep and cyclic life requirements while also enabling high OPR that improves SFC.

The foregoing has described a compressor cooling apparatus. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A compressor cooling apparatus, comprising:
a blade row mounted on a rim of a hub for rotation about a centerline axis;
an aft arm extending from a forward end positioned adjacent to the rim;
a stationary diffuser located downstream of, and in flow communication with, the blade row;
an inducer disposed between the diffuser and the blade row, the inducer having an inlet formed through a diffuser wall such that the inlet is in flow communication with the diffuser, and having an outlet positioned near the forward end of the aft arm and oriented to direct flow onto the rim and towards the blade row;
a void defined between the diffuser wall and the aft arm; and
a rotating seal extending radially outwards from the aft arm and terminating in close proximity to the inducer such that the outlet of the inducer is separated at least in part from the void.

2. The apparatus of claim 1 wherein the blade row comprises a rotatable disk having a hub, a web, and a rim, wherein a plurality of compressor blades extend from the rim.

3. The apparatus of claim 1 wherein the inducer defines a circumferential array of channels, the channels configured to change a tangential velocity of airflow through the inducer.

4. The apparatus of claim 1 wherein the diffuser includes an annular, generally conical inner wall.

5. The apparatus of claim 4 wherein the inner wall of the diffuser includes a feed hole formed therein.

6. The apparatus of claim 1 wherein the inducer comprises annular inner and outer walls interconnected by a central wall structure.

7. The apparatus of claim 1 wherein the blade row comprises:
   a rotatable disk having a rim defining an array of axial dovetail slots; and
   a plurality of compressor blades each having an axial dovetail received in one of the dovetail slots of the disk.

8. The apparatus of claim 7 further comprising a retaining ring securing the compressor blades in the dovetail slots.

9. The apparatus of claim 7 wherein each of the compressor blades is an airfoil-shaped body including opposed concave and convex side walls extending between a leading edge and a trailing edge.

10. The apparatus of claim 1 wherein the blade row is mounted for rotation inside an annular compressor casing.

11. A gas turbine engine apparatus, comprising:
    a compressor, a combustor, and a turbine arranged in a serial flow relationship, wherein the compressor includes:
    an annular compressor casing;
    a blade row mounted on a rim of a hub for rotation about a centerline axis inside the compressor casing;
    an aft arm extending from a forward end positioned adjacent to the rim;
    a stationary diffuser located downstream of, and in flow communication with, the blade row;
    an inducer disposed between the diffuser and the compressor, the inducer having an inlet formed through a diffuser wall such that the inlet is in flow communication with the diffuser, and having an outlet positioned near the forward end of the aft arm and oriented to direct flow towards the blade row;
    a void defined between the diffuser wall and the aft arm; and
    a rotating seal extending radially outwards from the aft arm and terminating in close proximity to the inducer such that the outlet of the inducer is separated at least in part from the void.

12. The apparatus of claim 11 wherein the blade row comprises a rotatable disk having a hub, a web, and a rim, wherein a plurality of compressor blades extend from the rim.

13. The apparatus of claim 11 wherein the inducer defines a circumferential array of channels, the channels configured to change a tangential velocity of airflow through the inducer.

14. The apparatus of claim 11 wherein the diffuser includes an annular, generally conical inner wall.

15. The apparatus of claim 14 wherein the inner wall of the diffuser includes a feed hole formed therein.

16. The apparatus of claim 11 wherein the inducer comprises annular inner and outer walls interconnected by a central wall structure.

17. The apparatus of claim 11 wherein the blade row comprises:
    a rotatable disk having a rim defining an array of axial dovetail slots; and
    a plurality of compressor blades each having an axial dovetail received in one of the dovetail slots of the disk.

18. The apparatus of claim 17 further comprising a retaining ring securing the compressor blades in the dovetail slots.

19. The apparatus of claim 17 wherein each of the compressor blades is an airfoil-shaped body including opposed concave and convex side walls extending between a leading edge and a trailing edge.

20. The apparatus of claim 11 wherein:
    the blade row includes an annular sealing element; and
    the diffuser includes one or more annular sealing elements which overlap the annular sealing element of the blade row in an axial direction.

* * * * *